Patented May 20, 1930

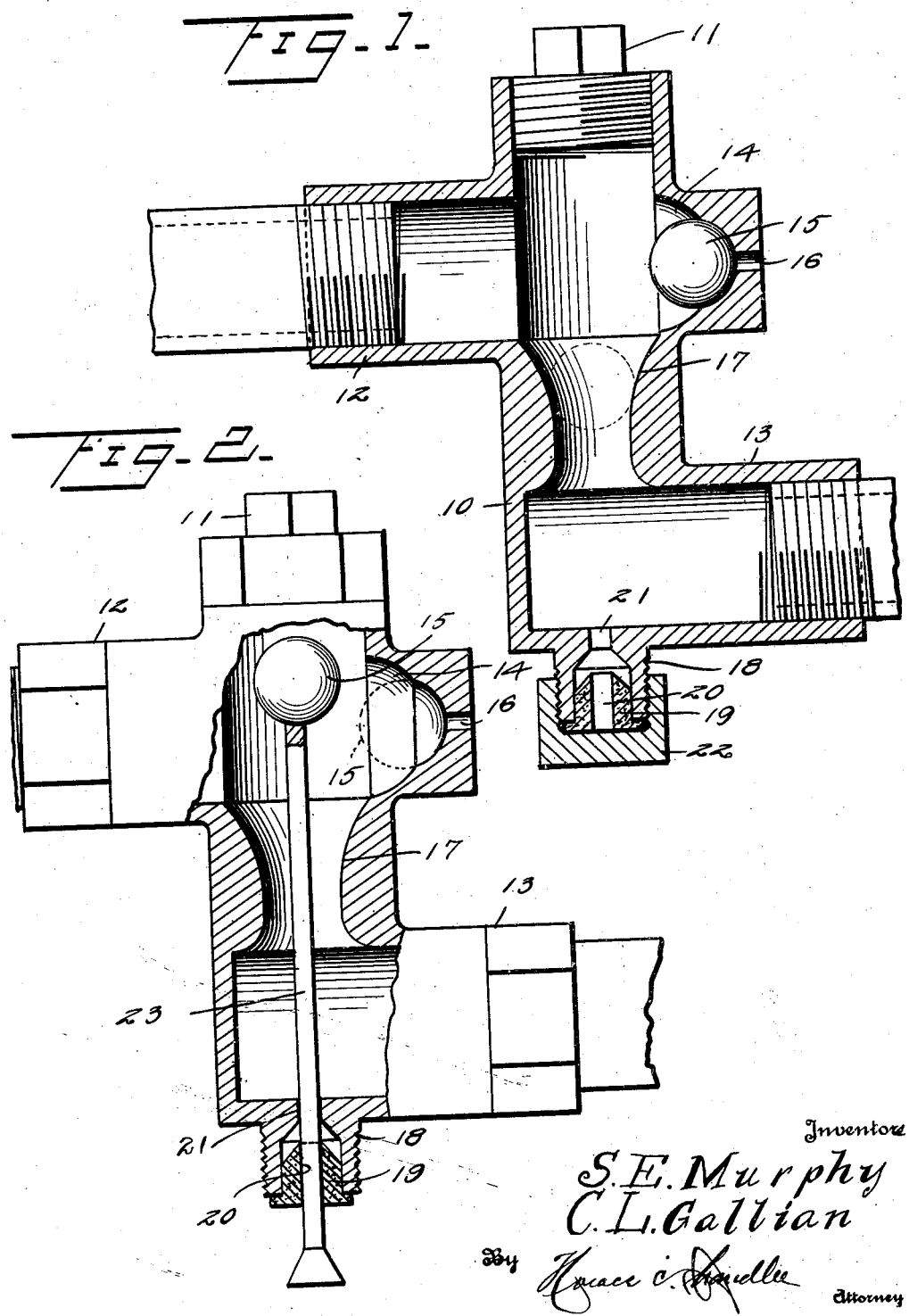

1,759,798

UNITED STATES PATENT OFFICE

SYLVESTER E. MURPHY AND CHARLES L. GALLIAN, OF RUSSELL, KENTUCKY

AUTOMATIC CUT-OFF

Application filed December 17, 1928. Serial No. 326,495.

This invention relates to new and useful improvements in valves, and particularly to pressure valves.

The principal object of the present invention is to provide a valve, of novel construction, by means of which gas or liquid pressure will be automatically cut off, when such pressure becomes reduced below a predetermined degree, whereby to prevent escape of such gas or liquid.

Another object is to provide novel and simple means for restoring the valve to normal operative condition, after having been closed by reduction of pressure.

Other objects and advantages will be apparent from the following description when taken in connection with the accompanying drawing.

In the drawing:

Figure 1 is a vertical sectional view through an automatic cut-off valve, made in accordance with the present invention, and showing the valve in operative position.

Figure 2 is a similar sectional view, showing the use of a rod for restoring the ball valve to its operative position.

Referring particularly to the accompanying drawing, there is shown a casing including the longitudinal body portion 10, one end being open and internally threaded to receive the removable closure plug 11. In one side of said end there is formed a branch 12 which is adapted to be connected with the source of gas or fluid supply, while the other end of the body is closed and has the branch 13 extending from the other side thereof, for connection with a conduit (not shown) leading to the point of use of such gas or fluid. In the side of the first-mentioned end of the body 10, directly opposite the inlet branch 12, there is formed a seat 14 for the ball valve 15, and in the center of said seat, leading out to the atmosphere, is a small vent 16. Formed in the body 10, between the inlet and outlet branches 12 and 13, is a valve seat 17, on which the ball valve 15 is adapted to fall, upon reduction of pressure entering the casing by means of the branch 12. On the closed end of the body, in line with the bore of said body, and externally thereof, there is formed an externally threaded tubular extension 18, in which is disposed a packing 19, having a central opening 20, alining with an opening 21 in the said end of the body, and on which is engaged a closure cap 22.

In the normal operation of the device, fluid is permitted to flow into the casing by means of the branch 12, such pressure serving to retain the ball valve 15 on the seat 14, whereby to prevent escape of fluid through the vent 16. The fluid will flow through the seat 17, and out through the branch 13. Should the pressure be reduced at the inlet branch 12, the ball valve 15 would fall from the seat 14 and rest on the seat 17, thereby preventing passage of fluid from the inlet branch 12 to the outlet branch 13. To restore the valve to operative condition, the operator removes the cap 22, and inserts the rod 23, and by proper manipulation moves the ball 15 upwardly so that it may be forced on the seat 14 by the incoming fluid, and be held there by the pressure of such fluid.

What is claimed is:

An automatic pressure valve including a casing having an inlet and an outlet means, a valve seat arranged opposite the inlet means and having a vent opening, a valve seat arranged in a plane at right angles to the first seat, and intermediate the inlet and outlet, a ball valve normally held on the first seat by the pressure of the incoming fluid and to gravitate to the other seat upon reduction of the pressure of such fluid, the casing having an opening in line with the second seat and provided with packing and a closure, and a rod arranged to be passed through said packing and opening for moving the valve from the second seat into position between said inlet and said vent, whereby it will be seated on the first seat by the pressure of the fluid.

In testimony whereof, we affix our signatures.

SYLVESTER E. MURPHY.
CHAS. L. GALLIAN.